United States Patent

[11] 3,571,526

[72] Inventors Paul R. Stockwell
Redwood City;
Jerry W. Miller, Menlo Park, Calif.
[21] Appl. No. 763,642
[22] Filed Sept. 30, 1968
[45] Patented Mar. 16, 1971
[73] Assignee Ampex Corporation
Redwood City, Calif.

[54] METHOD AND APPARATUS OF ELIMINATING PILOT SIGNAL INTERFERENCE IN FM MAGNETIC TAPE RECORDER SYSTEMS
9 Claims, 7 Drawing Figs.

[52] U.S. Cl. ........................................................ 179/100.2, 178/6.6, 325/45, 340/174.1
[51] Int. Cl. ........................................................ G11b 5/04, H03c 3/04
[50] Field of Search ............................................. 179/100.2 (K), 100.2 (S); 340/174.1 (A), 174.1 (B); 178/6.6 (A); 346/74 (M); 325/45, 50, 145

[56] References Cited
UNITED STATES PATENTS

| | | | |
|---|---|---|---|
| 3,003,036 | 10/1961 | Greefkes | 325/50 |
| 3,258,694 | 6/1966 | Shepherd | 325/145 |
| 3,304,377 | 2/1967 | Kietz et al. | 178/6.6 |

*Primary Examiner*—Bernard Konick
*Assistant Examiner*—Howard W. Britton
*Attorney*—Robert G. Clay

ABSTRACT: Method and apparatus for improving time-base error correction in magnetic tape recorders utilizing frequency-modulation and constant-frequency pilot signal recording techniques. Spurious nonessential frequency regions of the intelligence signal falling within the region of the pilot signal frequency are cancelled by processing the intelligence signal to generate a frequency spectrum in which the nonessential sidebands within the pilot signal region are redistributed to be concentrated on the frequency spectrum side of the carrier frequency opposite from the side of the pilot frequency. The pilot signal in the frequency range of the shifted nonessential sidebands is then added to be recorded with the processed intelligence signal.

Patented March 16, 1971 3,571,526

2 Sheets-Sheet 1

INVENTORS
JERRY W. MILLER
PAUL R. STOCKWELL
BY
Thomas G. Schatzel
ATTORNEY

INVENTORS
JERRY W. MILLER
PAUL R. STOCKWELL
BY Thomas G. Schatzel
ATTORNEY

METHOD AND APPARATUS OF ELIMINATING PILOT SIGNAL INTERFERENCE IN FM MAGNETIC TAPE RECORDER SYSTEMS

The invention herein described was made in the course of performance of a contract with the Department of the United States Army.

BACKGROUND OF THE INVENTION

In magnetic recording technology, information storage is dependent on mechanically moving parts at critical places in the magnetic tape recorder system. Therefore, most of the parameters defining the mechanical construction and performance of the recorder enter the transfer function from the time domain to the space domain in the recording process. Not only are these influential factors in the record mode, but also in the reverse process of information retrieval. The end result is that the reproduced information is a time function with spurious variations of the original recorded signals appearing as timing or time-base errors.

In rotary-head magnetic tape recording such as found in high frequency video and high rate digital recording machines, these mechanical system parameters can be divided into two classes of timing errors. The first class is not time variant and becomes evident only if the tape is played back on a machine different from the recording machine. If the tape is recorded and reproduced on the same machine, these errors cancel. Factors contributing to this first class of timing errors include: the flatness of the base plate holding the scanning head assembly and its inclination against the tape edge; the tape guide height and engagement adjustments; azimuth and quadrature tolerances of the head positions with respect to the drum.

The second class of timing errors comprises the time-variable or dynamic errors. Two groups can be distinguished: low frequency errors commonly referred to as "wow and flutter", and high frequency errors commonly referred to as "jitter." "Wow and flutter" errors originate through hunting of the head drum motor, due to nonsymmetrical motor fields, variations in the motor load through bearings, and head-tape friction. Other sources include variations in tape tension, tape guiding and tape dimensions. Tape "jitter" originates mainly from irregular changes in head-tape friction.

The time-base correction is based on the procedure of two elementary steps: measurement of the resultant record-reproduced time-base error and application of this error, after phase reversal, to the reproduced information or to the process of reproduction. The first of these two steps requires a "yardstick" to measure the error, i.e., a stable timing reference. Commonly, this "yardstick" is a separate timing signal of a select frequency referred to as a pilot signal. It is important that the pilot signal be subjected in the same manner and degree to the various time-base disturbances in the magnetic record-reproduce system as is the intelligence signal.

The intelligence signal may be recorded in frequency modulated (FM) form. The pilot signal is a constant frequency signal added to the FM signal to be recorded as a combined signal. The pilot signal serves as a timing reference for phase comparison with a frequency standard in the reproduce mode. A resultant signal representative of the timing error may provide head drum positional information and delay information to complement errors of off-tape signals. For additional discussion on time-base errors see U.S. Pat. No. 3,304,377 granted to E. K. Kietz, et al. on Feb. 14, 1967.

There are various conceivable ways of applying a pilot signal to the recording mode. These include time sharing, space sharing, level sharing and spectrum sharing of the pilot signal with the FM signal. Though each method has its desirable characteristics, spectrum sharing has been a favorable compromise with respect to an economical and technically effective solution. With spectrum sharing the pilot is added to the frequency modulated signal at a frequency which interferes little, if at all, with the intelligence information so that separation by filters is possible. However, crosstalk between data and pilot signals occurs when sidebands of the frequency modulated intelligence signal fall at, or near, the pilot frequency. This interference has a tendency to phase modulate the pilot signal, i.e., shift the zero crossings of the pilot signal. Consequently, jitter appears in the playback, with the jitter frequency being the order of the difference between the pilot frequency and the interfering sideband.

A variety of methods have been used in the past for dealing with the problem of data-to-pilot crosstalk. One approach identified those frequencies of the intelligence signal producing the worst interference as "critical" frequencies, and precautions were taken that these frequencies never appear at full level in the data signals to be recorded. Another approach has been to pass the modulator output through a bandstop filter to suppress the interference before the pilot signal is inserted. Before recording, the pilot region of the frequency spectrum generated in this way is virtually devoid of interference. However, because the tape behaves as a limiter, the signal recovered by the playback heads contains the interference components at approximately one-half the level they would have if no suppression were used. Even this reduction is not satisfactory for some highly sophisticated systems

SUMMARY OF THE PRESENT INVENTION

The present invention teaches a method and apparatus for further reducing data-to-pilot crosstalk. Referring to "intelligence signal" as a frequency modulated signal which produces a sideband pattern having components in the region of the pilot, during recording the intelligence signal is processed through alternative processing paths. In one embodiment, one path includes a bandstop filter to suppress frequencies of the intelligence signal within the region of the pilot signal frequency. The other path inverts and attenuates the entire intelligence signal frequency range. The two signals so processed are added together and limited to redistribute the sideband components of the intelligence signal in the pilot signal range to the opposite side of the carrier frequency. The pilot signal is subsequently added and the composite signal recorded. Consequently, before recording, the pilot frequency region of the spectrum of the composite signal is virtually free of interference. Since the intelligence signal is limited prior to recording on the tape, further limiting action by the tape fails to reconstitute those frequencies in the region otherwise interfering with the pilot signal.

DESCRIPTION OF THE PREFERRED EMBODIMENTS

Figures 1, 3:
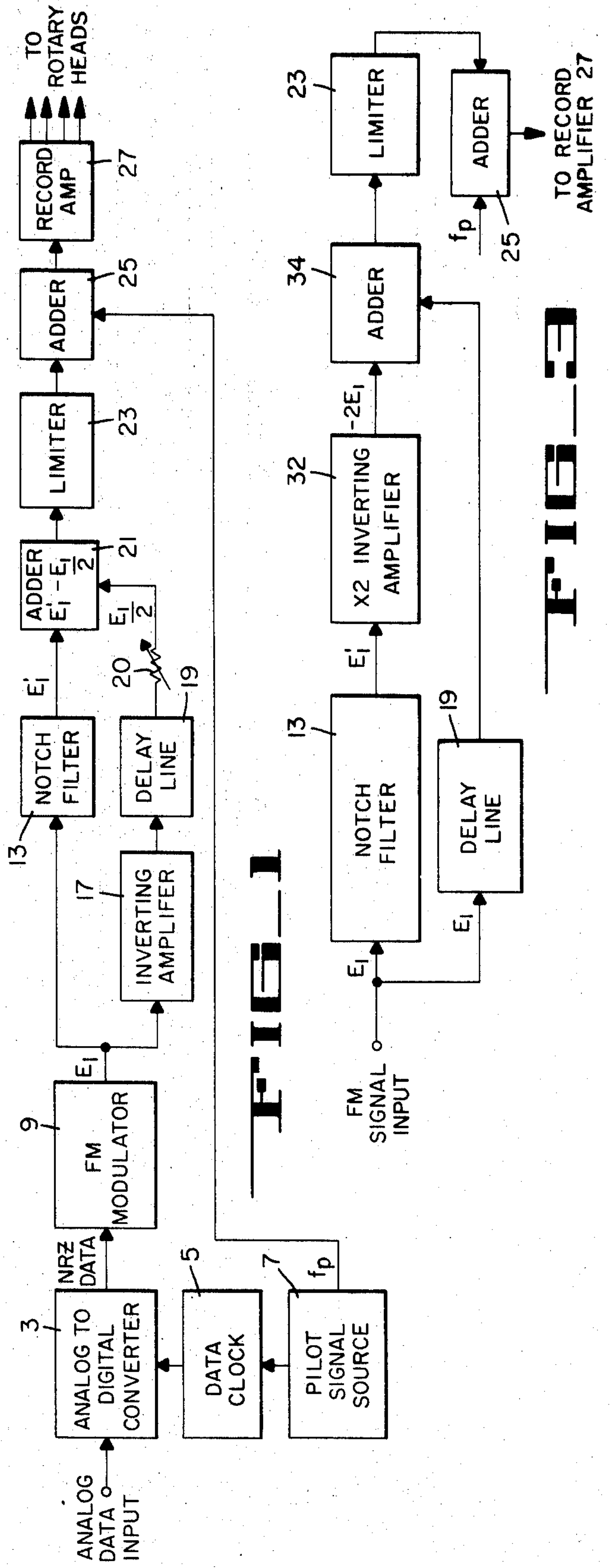
FIG. 1 is a block diagram of the record electronics of a recording system for practicing the present invention.
FIG. 3 is an alternative embodiment of a system for practicing the present invention.

Referring now to the drawings, FIG. 1 is a block diagram of the recording electronics of a wideband rotary head instrumentation digital tape recording system. For the present discussion it may be assumed that the initial information data input is in analogue form and converted by an analogue-to-digital converter 3 to a nonreturn-to-zero (NRZ) format. The converter may be of any type well known in the art for converting an analogue signal to nonreturn-to-zero digital signal having a transfer rate determined by a clock signal applied to a clock input thereof. The clock input of the converter is driven by a data clock 5 coupled to a high precision pilot signal source 7, e.g., a frequency standard or crystal oscillator. As will be hereinafter further described, the pilot signal serves as a timing reference in the reproduced process. The data clock 5 generates pulses in synchronism with and at a rate which is a multiple of the frequency of $f_p$ of the pilot signal to provide synchronization. A frequency modulation modulator 9 receives the NRZ signals and produces an intelligence signal including a carrier frequency, $f_c$ modulated by the information signal received at its input. Though in the instant embodiment the information signal is in a NRZ digital format, it will be appreciated that the information signal may be in various other formats, e.g., radar pulses, television video signals, multiplex telemetry or any format compatible with the modulator 9. The modulated output signal of the modulator 9 extends to alternative parallel paths, one comprising a notch filter 13 tuned to the frequency $fp$ of the pilot signal. The other path includes an inverting amplifier 17, a delay line 19 and an attenuator shown as a resistor 20. The output signal from the resistor 20 is received by a first adder network 21. The output of the first adder network 21 is then received by a limiter 23 extending to a second adder network 25. The second adder network also receives the pilot signal $fp$ from the pilot signal source 7. The frequency modulated intelligence signal and pilot reference are combined to provide a composite signal. A record amplifier 27 responds to the output of the adder 25 and is adapted to drive the rotary heads of the recorder (not shown).

The process of the pilot interference elimination as embodied in the present invention is believed to theoretically result in the following manner. The discussion centers about the case in which the intelligence signal comprises a carrier with one sinusoidal modulating frequency, and the pilot signal falling in the vicinity of the second order sideband. Obviously, the concept is not so limited. Interfering sidebands may be the third or higher order. Furthermore, the concept is applicable to the case where the intelligence signal is more complex, e.g., numerous modulating frequencies generating sidebands spaced from the carrier at frequencies of various combinations of the modulating frequencies, as is common in spectrum sharing. For example, as indicated in FIG. 1, the frequency modulated spectrum may be one produced by high bit NRZ-digital data. Basing the analysis on the assumed simplified signal sinusoidal modulating frequency, the frequency modulator 9 has a frequency carrier signal designated $fc$ and provides an output intelligence signal $E_1$. Assuming a modulating frequency $fm$, the frequency spectrum of the signal $E_1$ may be graphically represented by FIG. 2A. In frequency modulation analysis, Bessel function terms representing upper sideband signals all carry the same sign while lower sideband terms carry alternate signs. Hence, the first order (and all odd order) low sideband terms of the signal $E_1$ are relatively negative. Due to the nature of these systems it is commonly found desirable to utilize a pilot signal $fp$ of a frequency falling within the lower reaches of the frequency modulated signal spectrum. Selection of the pilot frequency is generally a compromise. It is necessary to consider the available bandwidth of the coupling network (e.g. rotary transformers) between the rotary heads and processing electronics. Also, the higher the pilot signal frequency, the closer it is to the spectrum of the modulated intelligence signal. At the same time, the higher the pilot frequency the better the resolution. Thus, the pilot frequency may be selected to fall within the region of a low sideband other than the first order lower sideband of the intelligence signal. As previously indicated, these sideband components appear as noise or interference to the pilot signal. In the illustration, $fp$ is selected to coincide with the second order lower sideband ($f_c-2f_m$). For example, it is a practice to select $fc$ at 6.3 MHz., and $fp$ at 0.5 MHz. with an $fm$ of 2.9 MHz.

Figure 2B:
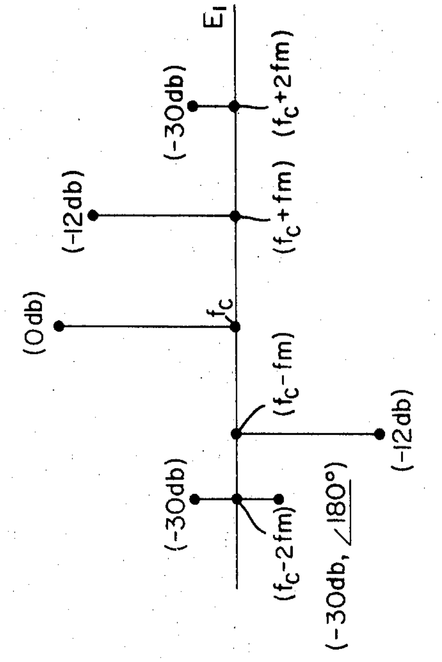
FIGS. 2A, 2B, 2C and 2D are graphical representations of the frequency spectrum of the signals at various points in the system of FIG. 1 to aid in explanation of the present invention.
Figure 2D:
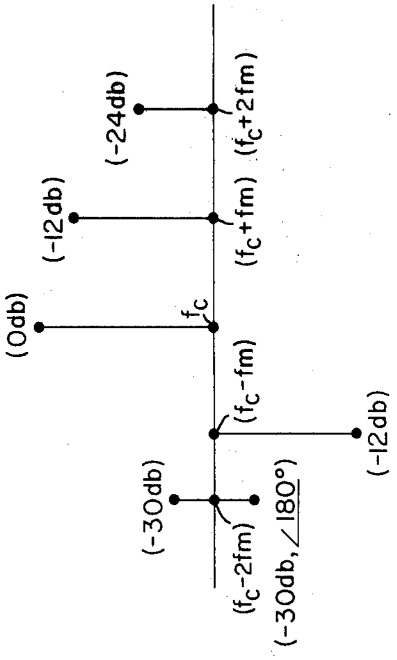
Figure 2A:
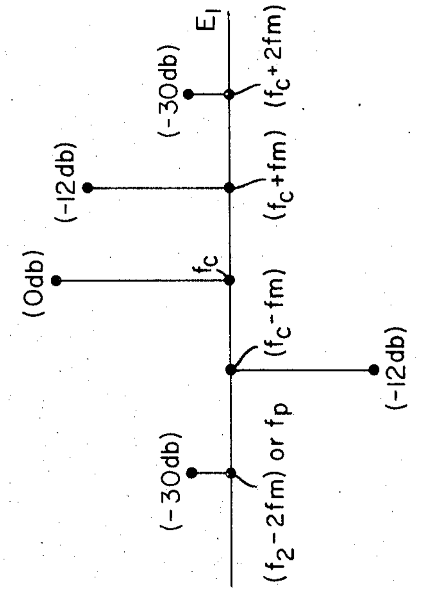

The intelligence signal $E_1$ from the modulator 9 is passed through a filter channel including the bandstop (notch) filter 13 removing the component $f_c-2fm$, with a resultant signal $E_1'$ of a frequency spectrum as shown by FIG. 2B. The filter 13 alters within the intelligence signal the amplitude relationship of the frequency ($fc-2fm$) to the remaining frequencies of the spectrum. Though the component ($fc-2fm$) is ideally completely attenuated, for analysis purposes, the notch filter can be considered to add a ($fc-2fm$) component of equal amplitude and 180° out of phase. The unfiltered $E_1$ signal is processed through an amplifying channel including the inverting amplifier 17 and the attenuator 20 to invert and decrease the amplitude in the order of one-half (6 db) its value. In essence, the filtered signal $E_1'$ is amplified in relationship to the amplitude of $E_1$ by attenuating $E_1$. The delay line 19 is introduced to equalize the delay in $E_1$ with the delay of signal $E_1'$ due to the notch filter 13. The adder 21 recombines the processed intelligence signals by adding the $E_1'$ and $-E_1$ 2 components. In the absence of an inverter in one of the processing channels, the means for recombining could take the form of a differential amplifier rather than adder. The spectrum diagram FIG. 2C, indicates that all components of the added signal are attenuated 6 db except the ($f_c-2f_m$) component such that this component has relatively doubled in amplitude. As is well known, in limiters which process FM intelligence signals, mixing occurs between the sideband components of the composite FM intelligence signal. However, if the FM intelligence signal is symmetrical, the signal is unaffected by the mixing. If the FM intelligence signal is unsymmetrical, i.e., one having a missing or an improper amplitude frequency component at the mating sideband component location of a pair of select order sideband components intelligence signal spectrum, some of its energy is transferred to the upper second order sideband component frequency of the same phase as the original upper second order sideband component frequency. Thus, after hard limiting by the limiter network 23, the spectrum is as shown by FIG. 2D. The limiting action as introduced in the record electronics transfers or distributes half the inverted component ($f_c-2f_m$) to a location above $fc$ equal to the frequency plus the added component, i.e. $f_c+2f_m$. The remaining half of the component cancels the second order lower sideband ($f_c-2f_m$), while the upper second order sideband ($f_c+2f_m$) is increased. Relating this to the first order sideband, as noted previously, first order upper and lower frequency modulation sidebands have opposite signs. The remaining $f_c-2fm$ component exactly cancels the original $f_c-2fm$ component achieving the desired cancellation of interference in the pilot signal region. Thus, the processing of the intelligence signal generates a frequency spectrum in which the nonessential second order sideband components are shifted and concentrated on the frequency spectrum side opposite from the pilot signal. As shown in FIG. 1, the limited signal from the limiter 23 is added with the pure pilot signal from source 7. The composite signal is processed by the record amplifier 27 and or a spurious sideband frequency component, mixing in the limiters results in a transfer of energy between the frequencies of the present sideband components and their respective missing or improper mating sideband component frequencies forming the unsymmetrical pairs of sideband components. Ordinarily, half the energy of a sideband component of unsymmetrical pairs of sideband components is transferred to its mating sideband components frequency location. As disclosed above with reference to FIGS. 2A—2C, the two processing channels and recombining means operate to provide an FM intelligence signal spectrum (see FIG. 2C) having a net frequency component at the lower second order sideband component frequency ($f_c-2fm$) which is of a phase opposite that for a symmetrical FM intelligence signal. This is a spurious sideband frequency component relative to the FM intelligence signal spectrum. Hence, by passing the unsymmetrical FM intelligence signal of FIG. 2C through a limiter, energy is transferred from the upper second order sideband component frequency to the missing proper phase lower second order sideband component frequency. Since the phase reversed lower second order sideband component frequency is a spurious sideband frequency component relative to the FM recorded on the magnetic tape. Though the head-to-tape recording process introduces some limiting action, it has been found that the ($f_c-2f_m$) or $fp$ frequency range does not acquire distortion resulting from the tape limiting action. Since the intelligence signal has already been hard limited by the network 23, further limiting action by the tape fails to reconstitute the interfering sidebands.

On playback (not shown) the pilot signal *fp* may be extracted from the composite frequency modulated signal by use of a band-pass filter within the playback electronics. The second upper sideband ($f_c$+2*fm*) is not recovered from tape. Thus, as the playback response attenuates the second order upper sideband, and the pilot filter removes the lower second order sideband, the modified second order sideband pattern recorded on the tape does no distort the demodulated signal.

Figure 2C:
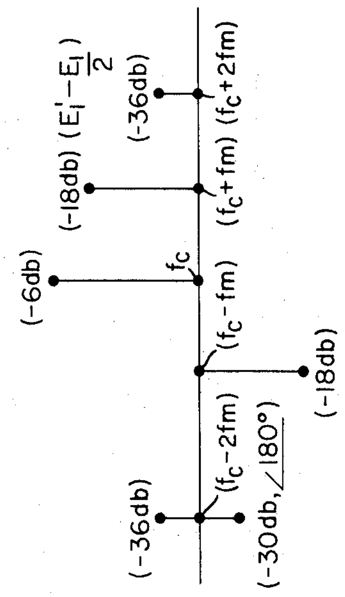

In FIG. 3 an alternative embodiment for practice of the present invention is shown. Those components of FIG. 3 which are analogous to those of FIG. 1 carry the same reference designation. In this embodiment there is a common filtering-amplifying channel in which the "added" $f_c$−2*fm* component equivalent to *fp* is obtained directly by bandstop filtering the intelligence signal $E_1$ to remove the $f_c$−2*fm* component. The frequency spectrum of the signal from the filter 13 coincides with $E_1'$ of FIG. 2B. The filtered $E_1'$ signal is then inverted and doubled in amplitude by an inverting amplifier 32 to realize a signal of $-2E_1'$. Simultaneously, the signal $E_1$ is processed through a direct channel having the delay line filter 19 in the alternate path to eliminate phase differential in the filtered and unfiltered signals. The filtered inverted signal −2E1'<=is added to the delayed frequency modulated signal $E_1$. The relative levels of the components about *fp* of ($f_c$−2*fm*) are as shown in FIG. 2C. The remainder of the analysis is the same as that of the firs embodiment. The signal from the adder 34 is limited by the limiter 23 to concentrate the second order sidebands of the modulated signal above the carrier frequency. The adder network 25 receives and combines the processed intelligence signal and pilot signal *fp*. It may be noted here, that the attenuation of one component of the intelligence signal with relationship to the other component to form the frequency spectrum of FIG. 2C is realized by doubling the amplitude of one component with relationship to the other.

Figure 4:
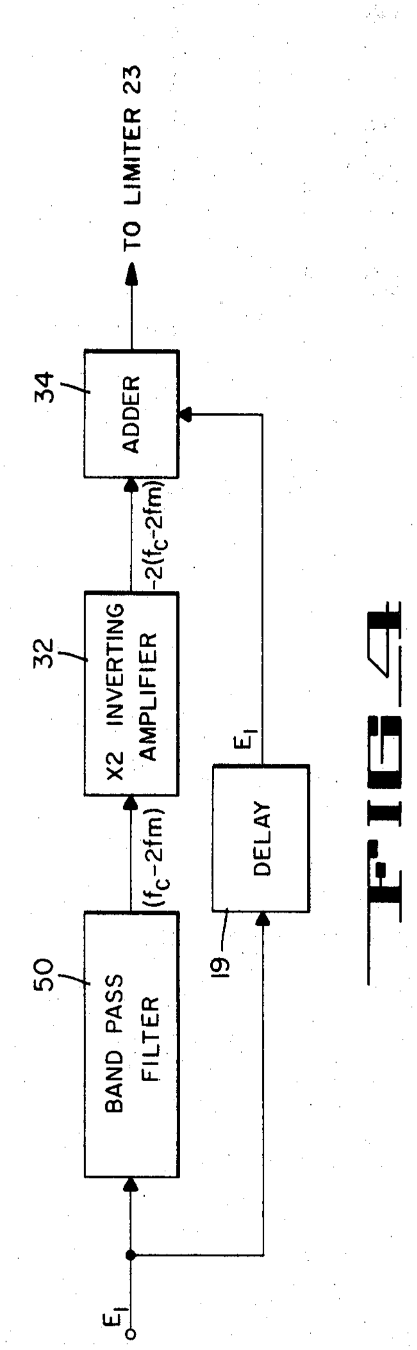
FIG. 4 is a third embodiment of a system for practicing the present invention.

FIG. 4 illustrates a further embodiment in which the filtering channel includes a band-pass filter 50 which is tuned to the frequency ($f_c$−2*fm*). The path further includes the inverting amplifier 32 extending to the adder 34. The other path, like FIG. 3, is direct including the delay line 19 receiving the intelligence signal $E_1$ and extending to the adder 34. It is noted that in FIG. 4 the amplitude relationship of the frequencies in the range of $f_c$−2*fm* are altered with relationship to the other frequencies by incorporating the band-pass filter 50 rather than a bandstop filter as in the other embodiments.

We claim:

1. A method for processing a composite signal including a frequency modulated intelligence signal and a pilot reference signal of a frequency within the frequency spectrum of the intelligence signal comprising the steps of:

processing a frequency modulated intelligence signal having a particular frequency spectrum including sideband components in a select frequency range through alternative channels to alter within the intelligence signal of one channel the amplitude relationship of those frequencies falling within the select frequency range to the remaining frequencies of the spectrum, and to alter the magnitude of the intelligence signal of the other channel relative to the magnitude of the altered intelligence signal of the one channel;

recombining the processed signals to form a new composite intelligence signal having a frequency amplitude spectrum in which those frequency components within said select range have an inverted amplitude over the original intelligence signal;

limiting said new composite intelligence signal to form a limited signal with a frequency spectrum with those frequency components in the select range redistributed above and below the carrier frequency of *fc* of the intelligence signal; and combining the limited signal with a pilot reference signal of a frequency *fp* within said select range.

2. The method of claim 1 in which the intelligence signal is simultaneously processed through a filtering channel to attenuate those sideband components within the select range and an amplifying channel to invert the intelligence signal and attenuate it in the order of 6 decibels.

3. The method of claim 1 in which the intelligence signal is simultaneously processed through a direct channel and a filtering amplifying channel to attenuate those sideband components within the select range and amplify in the order of 6 decibels the unfiltered signal.

4. The method of claim 1 in which the intelligence signal is simultaneously processed through a direct channel and filtering-amplifying channel to attenuate those frequency components outside the select range and amplify in the order of 6 decibels the unfiltered signals.

5. The method of claim 1 in which the selected range includes a select order lower sideband of the intelligence signal.

6. The method of claim 5 in which the select order lower sideband includes the second order lower sideband of the intelligence signal.

7. A method for improving time-base error correction in magnetic tape recorders utilizing frequency modulation recording techniques comprising the steps of:

frequency modulating a carrier frequency $f_c$ in accordance with an information signal to form an intelligence signal of a sideband pattern having components in a select frequency range;

processing said intelligence signal to generate a frequency spectrum of the intelligence signal in which nonessential sideband components in the select frequency range are attenuated on one side of the carrier frequency;

limiting the processed signal to form a limited signal with a frequency spectrum with those frequency components in the select range redistributed above and below the carrier frequency of *fp* of the intelligence signal; and adding a pilot reference signal of a frequency *fp* falling within the range of the attenuated sideband components.

8. The method of claim 7 in which the attenuated select frequency range includes the second order lower sideband of the intelligence signal, and said processing of said intelligence signal includes limiting the intelligence signal.

9. Recording electronics for a magnetic tape recorder utilizing frequency modulating recording techniques comprising, in combination:

a frequency modulator generating an intelligence signal having a carrier frequency *fc* and modulating frequency *fm;* a pair of parallel processing paths extending to the output of the modulator, one of said paths including filter means to attenuate select sidebands components of the intelligence signal, one of said paths including inverting means to invert the polarity of signals processed therethrough in relationship to the signals of the other path, and one of said paths including means to attenuate the amplitude of all frequencies processed therethrough in relationship to the signals of the other path;

first adder means extending to the pair of processing paths to recombine the processed signals;

limiter means receiving the recombined signals; and second adder means extending to the limiter means to receive the limited composite signal and to a pilot reference signal source of a frequency within the range of the attenuated select sidebands, to combine said composite signal and said pilot reference signal.

UNITED STATES PATENT OFFICE
CERTIFICATE OF CORRECTION

PATENT NO. : 3,571,526

DATED : March 16, 1971

INVENTOR(S) : PAUL R. STOCKWELL and JERRY W. MILLER

It is certified that error appears in the above-identified patent and that said Letters Patent are hereby corrected as shown below:

Transfer the text appearing in column 4, line 45, beginning with "or" through line 67, ending with "the FM" to column 4, line 22, after "components" .

Signed and Sealed thi

*twelfth* Day of *July 1977*

[SEAL]

*Attest:*

RUTH C. MASON
*Attesting Officer*

C. MARSHALL DANN
*Commissioner of Patents and Traden*